(12) United States Patent
Kong et al.

(10) Patent No.: US 7,651,969 B2
(45) Date of Patent: Jan. 26, 2010

(54) CATALYST SYSTEM FOR PRODUCING ETHYLENE (CO) POLYMER WITH IMPROVED BRANCH DISTRIBUTION

(75) Inventors: Gapgoung Kong, Sugarland, TX (US); Zhongyang Liu, Port Lavaca, TX (US); Honglan Lu, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 405 days.

(21) Appl. No.: 11/634,325

(22) Filed: Dec. 5, 2006

(65) Prior Publication Data

US 2008/0132406 A1    Jun. 5, 2008

(51) Int. Cl.
B01J 21/00    (2006.01)
B01J 37/00    (2006.01)

(52) U.S. Cl. .............. 502/116; 502/104; 502/110; 502/113; 502/114; 502/115; 502/152

(58) Field of Classification Search ........... 502/104, 502/113, 116, 123, 152
See application file for complete search history.

(56) References Cited

U.S. PATENT DOCUMENTS

| | | | | |
|---|---|---|---|---|
| 4,748,221 | A | 5/1988 | Collomb et al. | 526/153 |
| 4,804,648 | A * | 2/1989 | Job | 502/119 |
| 5,047,468 | A | 9/1991 | Lee et al. | 525/53 |
| 5,091,353 | A | 2/1992 | Kioka et al. | 502/111 |
| 5,192,731 | A | 3/1993 | Kioka et al. | 502/110 |
| 5,260,245 | A * | 11/1993 | Mink et al. | 502/115 |
| 5,336,652 | A | 8/1994 | Mink et al. | 502/125 |
| 5,561,091 | A | 10/1996 | Mink et al. | 502/115 |
| 6,500,906 | B1 | 12/2002 | Kong et al. | 526/124.2 |
| 6,590,046 | B2 | 7/2003 | Kong et al. | 526/151 |
| 6,841,498 | B2 | 1/2005 | Kong et al. | 502/103 |
| 6,956,003 | B2 | 10/2005 | Kong et al. | 502/150 |
| 2003/0069372 | A1 | 4/2003 | Lu et al. | |
| 2004/0157727 | A1 | 8/2004 | Lu et al. | |

FOREIGN PATENT DOCUMENTS

EP        0 703 246 B1    1/2002

OTHER PUBLICATIONS

Erbstoesser, Improved Ball Sealer Diversion, *Journal of Petroleum Technology*, pp. 1903-1910 (1980).
International Search Report and Written Opinion dated Apr. 17, 2008 for PCT Application Serial No. PCT/US07/24925.

* cited by examiner

*Primary Examiner*—Melvin Curtis Mayes
*Assistant Examiner*—Colin W Slifka
(74) *Attorney, Agent, or Firm*—Howrey LLP

(57) ABSTRACT

A process for synthesizing a catalyst component for manufacturing ethylene polymer and co-polymer. The present invention provides a process for synthesizing catalyst component (A), comprising forming a complex by contacting the solid intermediate (B) with an aluminum compound represented by formula $X_{3-n}Al(OY)_n$, and alkyl metal (C), wherein X is halide, Y is a hydrocarbon group or chelating carbonyl group, and wherein 1 is less than or equal to n which is less than or equal to 3, and then contacting the complex with titanium halide having formula $TiX_4$ wherein X is halide. Solid intermediate (B) is formed by reacting magnesium metal with alkyl halide in the presence of alkoxy aluminum represented by formula $Al(OR^a)_3$, silicon halide represented by formula $SiX_4$ and alkoxy silane represented by formula $Si(OR^b)_4$, wherein $R^a$ and $R^b$ are an aromatic or aliphatic alkyl group and wherein X is halide. Alkyl metal (C) is synthesized by reacting alkyl aluminum compounds represented by formula $AlR^c_3$ with a secondary amine having formula $HNR^d_2$ and then by reacting with alkyl magnesium compounds represented by formula $R^eMgR^f$, wherein $R^c$, $R^d$, Re and $R^f$ are an aromatic or aliphatic alkyl group. The catalyst component is suitable for producing ethylene polymer and co-polymer with narrow molecular weight distribution as well as improved branching compositional distribution.

15 Claims, No Drawings

CATALYST SYSTEM FOR PRODUCING ETHYLENE (CO) POLYMER WITH IMPROVED BRANCH DISTRIBUTION

BACKGROUND OF THE INVENTION

1. Field of the Invention

The present invention relates to a unique titanium-based catalyst system for producing linear low density co-polymers of ethylene. More specifically, the present invention relates to a catalyst comprising titanium and magnesium components. The catalyst is useful for producing ethylene polymers having narrow molecular weight distribution and improved branching compositional distribution.

2. Description of Related Art

Polyethylene polymers are well known and are useful in many applications. Linear low density polyethylene co-polymer (LLDPE), having density of 0.910 to 0.945 g/cm$^3$, is produced primarily using gas phase processes and has been important in commodity and industrial areas over last 20 years. Intense research has been directed to developing high performance LLDPE resins having better impact strength, higher transparency, and less wax content. For example, super strength LLDPE, an ethylene co-polymer having hexene as the alpha-olefin, displays narrow molecular weight distributions and narrow branch compositional distributions. Much effort has been focused on developing new catalyst systems for producing super strength LLDPE having these properties.

Single site catalyst systems employing organometallic compounds such as metallocene compounds are known for controlling molecular weight distributions and branching compositional distributions. Unfortunately, it is difficult to apply these catalysts in existing plants, so the use of such systems in gas phase processes for producing LLDPE has been slow to develop. Also, the solubility properties of organometallic compounds (MAOs) lead to less favorable immobilization processes on inorganic supports, further hindering their applicability.

In contrast, supported titanium-based catalysts (Ziegler-Natta catalysts) can be used in existing processes, without modification. Consequently, there has been intensive development of titanium based catalyst systems for improving molecular weight distribution and compositional distribution of LLDPE.

U.S. Pat. No. 4,748,221 and European Patent No. 0 703 246 A1 describe a common Ziegler-Natta catalyst system. Magnesium metal powder is reacted with butylchloride in a non-polar solvent in the presence of Ti(OR)$_4$. Further treatment with TiCl$_4$/Ti(OR)$_4$/butylchloride results in the formation of a catalyst suitable for gas phase ethylene co-polymerization. These patents use a one step reaction with BuCl, and TiCl$_4$/Ti(OR)$_4$. Also, the LLDPE obtained using this catalyst does not have the narrow molecular weight distribution and compositional distribution that is desired in the newer high performance resins, such as super strength LLDPE.

Other examples of titanium-based catalysts for traditional LLDPE are described in U.S. Pat. Nos. 5,047,468, 5,091,353, and 5,192,731. U.S. Pat. No. 5,047,468 describes a catalyst system for LLDPE production, which is obtained by dissolving MgCl$_2$ with [TiCl$_3$ (AlCl$_3$)$_{1/3}$] in THF to make a solution containing MgCl$_2$ and titanium halide that is subsequently immobilized on silica support. In U.S. Pat. Nos. 5,091,353 and 5,192,731, MgCl$_2$ is dissolved in electron donating solvent and reacted with alkylaluminum compounds to solidify magnesium halide with aluminum alkoxy compounds. Contacting the solid with titanium halide affords a solid silica catalyst with good morphology and co-polymerization ability. However, the polymer formed with the catalyst results in wide compositional distribution some polymers also with a wide molecular weight distribution.

U.S. Pat. Nos. 5,260,245, 5,336,652, and 5,561,091 describe a catalyst system in which dialkylmagnesium and silane compounds are reacted with —OH group of a silica support which is then contacted with transition metal halide to form relatively homogeneous active site. This catalyst system exhibits more homogeneous ethylene polymerization or co-polymerization capability than traditional magnesium-titanium (IV) halide based catalyst systems. However, this catalyst system requires extra processing steps because the silica support must be treated, either chemically or by heating, to remove bound water and excess —OH groups prior to the formation of the catalyst.

U.S. Pat. Nos. 6,500,906, 6,590,046, 6,841,498, and 6,956,003 describe a catalyst system that does not require immobilization of the titanium component onto the magnesium halide support prior to use. The catalyst system employs a liquid phase transition metal solution in-situ with solid magnesium halide support. The transition metal solution is prepared by reacting Mg[AlR'(OR)$_3$]$_2$ with a nitrogen bound chelating ligand (N-chelate ligand) such as dialkylcarbodiimide, and then with TiX$_4$ as described in where X is halide. This method has the advantage of not relying on a complicated immobilization process to ensure improved catalyst properties.

The preparation methods described in the art for the catalytic control of molecular weight distribution and/or branching compositional distribution are geared toward the complicated task of controlling the active site formation process, which in turn requires careful control of the catalyst precipitation process to ensure consistent catalyst properties. Catalyst properties are deteriorated in the absence of control over the precipitation process. Therefore, a need exists for a simple and efficient process for obtaining a magnesium-titanium based catalyst system for polyethylene polymer and co-polymer suitable for super strength LLDPE with controlled narrow molecular weight distribution and improved branching compositional distribution.

SUMMARY OF THE INVENTION

The present invention provides a process for synthesizing a catalyst component for manufacturing ethylene polymer and co-polymer. The present invention provides a process for synthesizing catalyst component (A), comprising forming a complex by contacting the solid intermediate (B) with an aluminum compound represented by formula X$_{3-n}$Al(OY)$_n$, and alkyl metal(C), wherein X is halide, Y is a hydrocarbon group or chelating carbonyl group, and n is number wherein 1 is less than or equal to n which is less than or equal to 3, and then contacting the complex with titanium halide having formula TiX$_4$ wherein X is halide. Solid intermediate (B) is formed by reacting magnesium metal with alkyl halide in the presence of alkoxy aluminum represented by formula Al(OR$^a$)$_3$, silicon halide represented by formula SiX$_4$ and alkoxy silane represented by formula Si(OR$^b$)$_4$, wherein R$^a$ and R$^b$ are an aromatic or aliphatic alkyl group and wherein X is halide. Alkyl metal (C) is synthesized by reacting alkyl aluminum compounds represented by formula AlR$^c{}_3$ with a secondary amine having formula HNR$^d{}_2$ and then by reacting with alkyl magnesium compounds represented by formula R$^e$MgR$^f$, wherein R$^c$, R$^d$, Re and R$^f$ are an aromatic or aliphatic alkyl group. The catalyst component is suitable for producing ethylene polymer and co-polymer with narrow molecular weight distribution as well as improved branching compositional distribution.

A further aspect of the invention is a catalyst system comprising component (A) and an alkyl aluminum co-catalyst component (D). This catalyst system is useful for polymerizing ethylene or ethylene co-polymer having a narrow molecular weight distribution and narrow compositional distribution.

A further aspect of the present invention is a process for using the catalyst system described above to produce ethylene co-polymers having narrow molecular weight and compositional distributions and improved branching distribution. The process may be either a gas-phase or a slurry process.

DESCRIPTION OF ILLUSTRATIVE EMBODIMENTS

The present invention provides a titanium-based catalyst system that is capable of producing polyethylene polymer and co-polymer having a narrow molecular weight distribution and narrow compositional distribution suitable for super strength LLDPE.

One aspect of the present invention is a magnesium-titanium metal-based catalyst component (A) that is prepared by forming a solid intermediate (B) by reaction of magnesium metal and alkyl halide in the presence of aluminum alkoxy represented by formula $Al(OR^a)_3$, silicon halide represented by formula $SiX_4$ and alkoxy silane represented by formula $Si(OR^b)_4$ where in R, $R^a$, $R^b$ are an aromatic or aliphatic alkyl group. Presumably, solid intermediate (B) might be composed of magnesium, aluminum, silane, halide, and alkoxy.

Mg+RCl+[Al(OR$^a$)$_3$, SiX$_4$, Si(OR$^b$)$_4$]→Solid Intermediate (B)

Synthesizing an alkyl Metal (C) by reacting alkylaluminum compounds represented by formula $AlR^c_3$, with a secondary amine having formula $HNR^d_2$, and consecutively contacting the resulting product with alkylmagnesium compounds represented by formula $R^eMgR^f$, where in X is halide, and $R^c$, $R^d$, $R^e$ and $R^f$ are an aromatic or aliphatic alkyl group.

AlR$^c$$_3$+HNR$^d$$_2$+R$^e$MgR$^f$→Alkyl Metal (C)

Contacting the solid intermediate component (B) with an aluminum compound represented by formula $X_{3-n}Al(OY)_n$, and Alkyl metal (C), and then consecutively with titanium halide having formula $TiX_4$ to obtain catalyst component(A), Solid Intermediate (B)+X$_{3-n}$Al(OY)$_n$+Alkyl Metal (C)+TiX$_4$→Catalyst Component (A)

wherein X is halide, and Y are an hydrocarbon or chelating carbonyl group, and wherein 1 is less than or equal to n which is less than or equal to 3.

The chemical reactions used to prepare the catalyst system of the present invention are depicted schematically in Scheme 1 and are described in detail below, where in X is halide, and R, $R^a$, $R^b$, $R^c$, $R^d$, $R^e$ and $R^f$ are an aromatic or aliphatic alkyl group, Y is an hydrocarbon or chelating carbonyl group, and n is number.

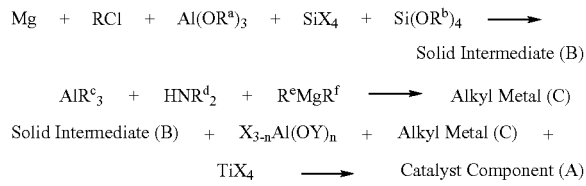

Preparation of Solid Intermediate (B):

The solid intermediate (B) of the present invention can be formed from magnesium metal and alkyl halide similar to methods known in prior art. The reaction of magnesium metal and alkyl halide can be initiated and propagated to synthesize solid intermediate material in a non-polar solvent by adding aluminum alkoxide represented by formula $Al(OR^a)_3$ and silicon halide represented by formula $SiX_4$.

The reaction can be initiated using a catalytic amount of $Al(OR^a)_3$ at high temperature, for example, about 80° C. to 100° C. Once initiated, adequate amount of $SiX_4$ and $Si(OR^b)_4$ are added at one time and continuous reaction between magnesium and alkylhalide is maintained by feeding alkylhalide to sustain the reaction until all the magnesium powder is converted to gray solid material, presumably magnesium halide intermediate containing aluminum and silicon.

After the magnesium powder is consumed by the reaction, further stirring at between 80° C. and 100° C. for 1-4 hours completes the reaction to form solid intermediate (B). Molar ratio of $Al(OR^a)_3$ over magnesium metal could be 0.01 to 0.3, and preferably 0.05 to 0.2. Molar ratio of $SiX_4$ over magnesium metal could be 0.1 to 1.0, and preferably 0.2 to 0.5, Molar ratio of $Si(OR^b)_4$ over magnesium metal could be 0.1 to 1.0, and preferably 0.2 to 0.5 wherein $R^a$ and $R^b$ are an aromatic or aliphatic alkyl group.

The solid intermediate(B) is in fragile fine particle form and it is transformed to firm and bigger size of solid catalyst particle through the consecutive reaction with alkyl metal (C) and titanium halide described below.

Examples of suitable alkylhalide represented by RCl include any primary alkyl halide that can make a oxidative addition reaction with magnesium metal to make a magnesium halide species such as butyl chloride, 1-chloropropane, 1-bromo propane, ethyl chloride butyl bromide, ethyl bromide, methyl chloride, and methyl bromide.

Examples of aluminum alkoxy represented by $Al(OR^a)_3$ are aluminum sec-butoxide, aluminum methoxide, aluminum ethoxide, aluminum propoxide, aluminum iso-propoxide, aluminum butoxide, aluminum tert-butoxide, aluminum hexoxide, aluminum phenoxide, and combinations thereof. The chemical formulas of these compounds include $Al(OR^a)_3$ is $Al(O-_sBu)_3$, $Al(OMe)_3$, $Al(OEt)_3$, $Al(OnC_3H_7)_3$, $Al(OiC_3H_7)_3$, $Al(OnC_4H_9)_3$, $Al(O-tC_4H_9)_3$, $Al(OC_6H_{13})_3$, and $Al(OC_6H_5)_3$.

Examples of silicon halide represented by $SiX_4$ are silicon tetrachloride and silicon tetrabromide. Examples of suitable silicon alkoxy represented by $Si(OR^b)_4$ are tetraethoxy silane or tetrabutoxy silane.

Preparation of Alkyl Metal (C):

Alkyl metal (C) is prepared in two step reactions; reacting an alkylaluminum compound represented by formula $AlR^c_3$, with a secondary amine represented by formula $HNR^d_2$, and then consecutively adding alkylmagnesium represented by formula $R^eMgR^f$ to the resulting yellow solution where $R^c$, $R^d$, $R^e$, $R^f$ are an aromatic or aliphatic alkyl group. Alkyl metal (C) may have an atomic ratio of aluminum to magnesium of about 0.3 to about 2.0.

The reaction between alkylalumunum $AlR^c_3$ and a secondary amine $HNR^d_2$ is carried out in a non-polar solvent such as hexane, heptane, or toluene. The reaction product is suitable for the following steps in situ without further separation or characterization. $R^d$ is a cyclic hydrocarbon represented by the formula $C_nH_{2n}$ and n is a number larger than 4. For example, $R^d$ may be cyclopentyl, cyclohexyl, cycloheptyl, or cyclooctyl cyclic hydrocarbon.

Examples of suitable amine compounds include any secondary amine compounds having a nitrogen-hydrogen bond such as branched amines, cyclic amines having 4-14 carbon atoms, and aromatic amines. Examples include diethylamine, dipropylamine, di-isopropylamine, dibutylamine, di-sec-butylamine, di-tert-butylamine, dihexylamine, dicyclo-hexylamine, piperidine, and aromatic amines including aniline or aniline derivatives such as 2,6-diethylaniline, 2,6-di-tert-butylaniline. Also, examples of suitable alkylaluminum compounds include compounds containing reactive alkyl-aluminum bonds, for example trimethylaluminum, triethylaluminum, tributylaluminum, tri-isobutylaluminum, trihexylaluminum, and trioctylaluminum.

Reaction temperatures can be varied depending on character of amine compounds, but mild reaction temperatures of about 10 to about 40° C. are typical. The molar ratio of alkylaluminum to amine is typically about 0.05 to about 5.

Next, without separation or purification, alkylmagnesium represented by formula $R^eMgR^f$ is added to the product of the above reaction between alkylaluminum, $AlR^c_3$ and amine, $HNR^d_2$ to complete the preparation of alkyl metal (C). The mixture is stirred at about 10 to about 40° C. for about 1 hour. Examples of suitable alkylmagnesium compounds include dibutylmagnesium, butyloctylmagnesium, and butylethylmagnesium.

Additionally, cyclopentadiene derivatives may be added to alkyl metal (C) to increase the miscibility, or solubility in hexane. The cyclopentadiene derivatives include dicyclopentadiene, indene, fluorene, methylcyclopentadiene, dimethylcyclopentadiene, trimethylcyclopentadiene, tetramethylcyclopentadiene, pentamethylcyclopentadiene, (t-butyl)-cyclopentadiene, methylethylcyclopentadiene, trimethylsilylcyclopentadiene, triethylcyclopentadiene. Molar ratio of cyclopentadiene derivatives to alkylmagnesium is about 0.05 to 0.5 and more preferably 0.1 to 0.3

Alkyl Metal (C) is typically very soluble in non-polar solvents and are stable at room temperature. They can typically be used in situ without further purification or separation. Molar ratio of alkylmagnesium to alkylaluminum is about 0.1 to 1.0 and more preferably 0.4 to 0.7.

Preparation of Catalyst Component (A)

According to present invention, catalyst component(A) can be prepared through consecutive contact reaction of solid intermediate(B) with an aluminum compound represented by formula $X_{3-n}Al(OY)_n$, and with metal alkyl(C), and then with titanium halide $TiX_4$, where X is halide, Y is an hydrocarbon or chelating carbonyl group, and n is number. Y can be a hydrocarbon or chelating carbonyl group such as ethyl, sec-butyl, bisethylacetoacetl, ethylacetoacetyl or others. Examples of $X_{3-n}Al(OY)_n$ include aluminum triethoxide, aluminum tri-sec-butoxide, aluminum butoxide, diethoxyaluminum chloride, or chelating alkoxy compounds such as aluminum butoxide bisethylacetoacetate, aluminum dibutoxide ethylacetoacetate, aluminum tetranethyl 3,5 heptanedionate, aluminum 2,4-pentanedionate, aluminum diisopropoxide ethylacetacetate, aluminum-8-hydroxyquinolinate, or combinations thereof. The halide can be any halide, such as chlorine or fluorine.

Solid Intermediate (B)+$X_{3-n}Al(OY)_n$+Alkyl Metal
(C)+$TiX_4$→Catalyst Component (A)

Intermediate solid (B) is contacted with an aluminum compound represented by formula $X_{3-n}Al(OY)_n$ in molar ratio of 0.5-2.5 mmol per gram of intermediate solid (B) for 20 to 50 minutes.

Examples of suitable aluminum compounds represented by formula $X_{3-n}Al(OY)_n$ are non-chelating compounds such as aluminum triethoxide, aluminum tri-sec-butoxide, aluminum butoxide, diethoxyaluminum chloride, or chelating alkoxy compounds such as aluminum butoxide bisethylacetoacetate, aluminum dibutoxide ethylacetoacetate, aluminum tetranethyl 3,5heptanedionate, aluminum 2,4-pentanedionate, aluminum diisopropoxide ethylacetacetate, aluminum-8-hydroxyquinolinate.

The OY group can be the same or different. For example, in the case of $Al(OEt)_3$, the OY group is all OEt. But in the case of $Al(OBu)(EtC(=O)-CH_2-C(-O)Et)_2$ one OY group is OBu and the other is $EtC(=O)-CH_2-C(-O)Et$, thus the aluminum compounds can have different OY groups.

Examples of $TiX_4$ include titanium tetrachloride, titanium tertrabromide, and titanium tetraiodide.

And consecutively resulting slurry is contacted with metal alkyl(C) for 20 minutes to 3 hour in molar ratio of 0.4 to 1.0 mmol magnesium per g of solid intermediate(B), and then without further isolation or separation, reacted with $TiX_4$ for 2 to 5 hour at room temperature to prepare a solid catalyst Component (A). The reaction is preferably conducted in non-polar solvents, for example, pentane, hexane, or heptane. Other solvents can be used without deviating from the scope of the invention.

Examples of suitable amine compounds include any secondary amine compounds having a nitrogen-hydrogen bond such as diethylamine, dipropylamine, di-isopropylamine, dibutylamine, di-sec-butylamine, di-tert-butylamine, dihexylamine, dicyclo-hexylamine, piperidine, and aromatic amines including aniline or aniline derivatives such as 2,6-diethylaniline, 2,6-di-tert-butylaniline. Also, examples of suitable alkylaluminum compounds include compounds containing reactive alkyl-aluminum bonds, for example trimethylaluminum, triethylaluminum, tri-isobutylaluminum, trihexylaluminum, trioctylaluminum or their derivatives.

Reaction temperatures can be varied depending on character of amine compounds, but mild reaction temperatures of about 10 to about 40° C. are typical. The molar ratio of alkylaluminum to amine is typically about 0.05 to about 5.

Aluminum Co-Catalyst Component (D)

The supported catalyst component (A) prepared above can be combined with ordinary alkylaluminum co-catalysts (D) to polymerize ethylene. The aluminum co-catalysts (D) are used in an amount that is sufficient to promote the polymerization activities of the solid catalyst component (A). According to one embodiment, the Al/Ti molar ratio is varied from about 0.5 to about 500, preferably about 2 to about 100, and most preferably from about 2 to about 30. Examples of suitable aluminum co-catalyst (D) include trialkylaluminums such as triethylaluminum, tributylaluminum, trioctylaluminum, trimethylaluminum, and dialkylaluminum halide such as diethylaluminum chloride, dibutylaluminum chloride, and alkylaluminum sesquichloride such as ethylaluminum sesquichloride, butylaluminm sesquichloride.

Polymerization Using Catalyst Component (A) and Aluminum Co-Catalyst (D)

Catalyst component (A) in the present invention can be used to polymerize ethylene or co-polymerize ethylene with an alpha-olefin having 3 to 10 carbon atoms, preferably 4 to 10 carbon atoms, in the presence of aluminum co-catalyst (D). Examples of suitable alpha-olefins having 3 to 10 carbon atoms include propylene, 1-butene, 1-pentene, 1-hexene, 4-methyl-1-pentene, 3-methyl-1-pentene, 1-octene and 1-decene. The polymerization of ethylene or co-polymerization of ethylene with an alpha-olefin can be performed in the liquid (slurry) or vapor phase in the presence or absence of an inert polymerization solvent. One of skill in the art would recognize that the catalyst system of the present invention is also suitable for any of the gas phase processes known in the art.

According to one embodiment, the polymerization temperature is from about 20° C. to 150° C. and the polymerization pressure is from about one to about 100 Kg/cm² G, especially from 2 to 50 Kg/cm²-G. According to one embodiment, the polymerization or co-polymerization using the catalyst system of present invention is performed in the presence of hydrogen to control the molecular weight of the polymer.

One measure of molecular weight distribution is melt flow ratio (MFR), which is the ratio of the high load melt index (HLMI or $I_{21.6}$) to the melt index (M.I. or $I_{2.16}$) of a given resin, that is:

MFR=HLMI/M.I.

For a regular resins, MFR values tends to increase as M.I decreases and MFR values tends to decrease as M.I. increases. The melt flow ratio is believed to be an indication of the molecular weight distribution of the polymer and the higher the value, the broader the molecular weight distribution. Resins having relatively low MFR values for a given melt index M.I. typically have relatively narrow molecular weight distributions. Additionally, LLDPE resins having relatively low MFR values produce films of better strength properties than resins with high MFR values.

The catalyst component A of present invention, when used in the presence of ordinary alkylaluminum co-catalyst C, polymerizes ethylene-copolymer having significantly narrower molecular weight distribution and improved branching composition distribution than the co-polymer made with reference catalysts, as indicated by smaller MFR and lower melting point of the resulting co-polymers. Also, the present catalyst component shows improved co-monomer response, indicated by lower density values for resulting polymers, compared to those polymers made using ordinary catalysts under the same co-monomer/ethylene molar ratio. The solid catalyst component A of the present invention is useful for producing ethylene co-polymer resins having densities of about 0.910 to about 0.960 g/cm³ from ethylene and an alpha-olefin having 3 to 10 carbons.

The following examples are included to demonstrate particular embodiments of the invention. It should be appreciated by those of skill in the art that the techniques disclosed in the examples which follow represent techniques discovered by the inventor to function well in the practice of the invention, and thus can be considered to constitute some of the preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Preparation of Solid Intermediate (B)

Magnesium powder (31.3 g), hexane (2 liter), and of iodine (2.2 g) were introduced successively into 5-liter reactor, and 1.2 ml isobutanol, 2.8 ml n-BuCl, and 15 ml of tri(sec-butoxy) aluminum were added. The mixture was heated with stirring to 85° C. and maintained stirring for 30 minutes. Then lowered temperature to 80° C. and when the temperature reached 80° C., rapidly added 15 ml tetraorthosilicate (Si(OEt)₄) and 50 ml of silicon tetrachloride, and followed by slow introduction of 200 ml of n-butylchloride over 4 hours. Following the addition of n-butylchloride, the reaction mixture was stirred at 80° C. for 2 more hours and then cooled to room temperature (30° C.). The resulting precipitate was triply washed with 2000 mL hexane to obtain the solid intermediate (B).

Preparation Catalyst Component (A).

A hexane solution of triethylaluminum (160 mmol) was placed in 1000 mL flask and dicyclohexylamine (160 mmol) was added slowly over 30 minutes and stirred for 1 hour to yield a pale yellow solution. Then, butyloctylmagnesium (BOM) solution in heptane (80 mmol) was added and stirred for another 30 min. to prepare alkyl metal(C).

To the solid intermediate prepared above, 120 mmol of tri(sec-butoxy)aluminum was added with 1000 ml hexane and after 20 min. stirring at room temperature(30° C.), alkyl metal (C) solution prepared above was added and stirred for another 50 min. Then, 20 ml of titanium tetrachloride (TiCl₄) was added and stirred for 2 hours. The solid portion was washed three times to get catalyst component (A). Analysis shows that catalyst (A) contains 2.11% Ti.

Pre-Polymerization

A 5.0 liter autoclave reactor was purged with nitrogen and charged with 2000 mL of purified hexane. 40 mmol of tri-octylaluminum (n-$C_8H_{17}$)₃ Al and 8.0 g catalyst (A) were added under a slow nitrogen purge. The reactor vent was closed and the temperature was raised to 65° C. The ethylene was fed into the reactor at constant flow rate of 160 g/hr for 3 hours and the resulting polymer slurry was dried under nitrogen to obtain 480 g of pre-polymer.

Gas Phase Ethylene/1-Hexene Co-Polymerization.

A 400 g of round shaped LLDPE pellet originating from a commercial plant was added to a 10-liter jacketed reactor equipped with a stirrer, and 60 g-80 g of pre-polymer prepared above were introduced into the reactor. The pellet and pre-polymer mixture were stirred at 1000 rpm. The reactor temperature was raised to 65° C. and internal pressure was raised to 16 psi with hydrogen. Then, ethylene was introduced with 1-hexene at molar ratio of $C_6/C_2$=0.067 to 0.10 as in Table 1 for a period of time until the total ethylene feeding reaches up to 1000 g and reactor temperature was maintained at 85° C.

The resulting polymer was analyzed and listed in Table 1, and it shows that current invention product shows narrow M.W.D. by MFRR. Melting point ($T_m$ by DSC) of resulting polymer by present catalyst is substantially lower than conventional product (Comparative Example 1, 2). A TREF plot of the resulting polymer of Example 1 and Example 2 illustrates that Example 1 and 2 products have significantly narrow branch distribution.

EXAMPLE 2

Preparation of Solid Intermediate (B)

Solid intermediate (B) was prepared with the same method described in Example 1 except Si(OEt)₄ was not added.

Preparation Catalyst Component (A)

A hexane solution of triethylaluminum (160 mmol) was placed in 1000 mL flask and dicyclohexylamine (160 mmol) was added slowly over 30 minutes and stirred for 1 hour to yield a pale yellow solution. Then, butyloctylmagnesium (BOM) solution in heptane (80 mmol) was added and stirred for another 30 minutes to prepare alkyl metal(C).

To the solid intermediate prepared above, 120 mmol of tri(sec-butoxy)aluminum was added with 1000 ml hexane and after 20 min. stirring at room temperature, alkyl metal (C)

solution prepared above was added and stirred for another 50 min. Then, 15 ml of tetraorthosilicate (Si(OEt)$_4$) was added and after stirring for 30 min., 20 ml of titanium tetrachloride (TiCl$_4$) was added and stirred for 2 hours. The solid was washed three times to get catalyst component (A). Analysis shows that catalyst (A) contains 2.5 percent Ti.

Gas Phase Ethylene/1-Hexene Co-Polymerization.

Pre-polymerization and Gas phase polymerization were done in the same manner as Example 1 and polymerization results are listed in Table 1.

EXAMPLES 3-5

Preparation of Solid intermediate (B) and Catalyst Component (A) were prepared in the same method described in Example 1, except Si(OEt)$_4$ amount was changed as listed below.

|  | Example 3 | Example 4 | Example 5 |
|---|---|---|---|
| Si(OEt)$_4$ added | 3 ml | 8 ml | 15 ml |

Ethylene Polymerization and Gas Phase Co-Polymerization

Polymerization was done in the same manner as Example 1 and gas phase polymerization results are listed in Table 1.

EXAMPLE 6-11

Preparation of Solid intermediate (B) and Catalyst Component (A) were prepared in the same method described in Example 1, but the chemical amount added was changed as listed below.

|  | $X_{3-n}Al(OR)_n$ compounds | Alkyl metal (C) R$_3$Al | | TiCl$_4$ |
|---|---|---|---|---|
|  |  | mmol | mmol | mmol |
| Example 6 | Al(O-s-Bu)$_3$ | 100 | Et$_3$Al | 80 | 160 |
| Example 7 | Al(OEt)$_2$Cl | 120 | Octyl$_3$Al | 60 | 150 |
| Example 8 | Al(OEt)$_3$ | 120 | iBu$_3$Al | 100 | 120 |
| Example 9 | Aluminum 2,4 pentadionate | 160 | Me$_3$Al | 80 | 160 |
| Example 10 | Al(OiPr)$_3$ | 120 | Octyl$_3$Al | 80 | 150 |
| Example 11 | Al 3,5 heptanedionate | 120 | Me$_3$Al | 80 | 160 |

Ethylene Polymerization and Gas Phase Co-Polymerization

Polymerization was done in the same manner as Example 1 and gas phase polymerization results are listed in Table 1.

COMPARATIVE EXAMPLE 1

A catalyst was prepared according to U.S. Pat. No. 4,748,221. Magnesium powder (31.3 g), hexane (2 liter), and of iodine (2.2 g) were introduced successively into 5-liter reactor, and 1.2 ml isobutanol, and temperature was raised to 80° C. Then, titanium tetrachloride (20 ml) and tetrapropyltitanate (40 ml) were added and followed by slow addition over 4 hours of 230 mL of n-butylchloride. The mixture was stirred for a further 2 hours at 80° C., and then cooled to 40° C. The solid precipitate was washed with hexane three times to yield catalyst component (A)

COMPARATIVE EXAMPLE 2

Solid intermediate (B) was prepared in the same method described in Example 1.

Preparation Catalyst Component (A).

To the solid intermediate prepared above, 20 ml of titanium tetrachloride (TiCl$_4$) was added with 1000 ml hexane and stirred for 1 hour at 80° C. The solid portion was washed three times to get catalyst component (A). Analysis shows that catalyst (A) contains 4.11% Ti.

Gas Phase Ethylene/1-Hexene Co-Polymerization.

Pre-polymerization and Gas phase polymerization were done in the same manner as Example 1 and polymerization results are listed in Table 1.

This Comparative Example 2 is comparable to Example 1 and is used to illustrate subtle process differences.

TABLE 1

Gas Phase ethylene/1-hexene co-polymerization results

|  | Pre-polymer used | Yield | C6/C2 | Density | M.I. | MFRR | Tm (° C.) by DSC |
|---|---|---|---|---|---|---|---|
| Example 1 | 60 g | 1200 g | 0.067 | 0.9210 | 1.2 | 26.5 | N/A |
| " | 60 g | 1100 g | 0.078 | 0.9185 | 1.0 | 27.1 | 124.0 |
| " | 60 g | 1000 g | 0.089 | 0.9165 | 1.1 | 28.3 | 123.5 |
| " | 60 g | 1000 g | 0.101 | 0.9145 | 1.2 | 29.5 | 122.9 |
| Example 2 | 70 g | 1200 g | 0.067 | 0.9201 | 1.5 | 26.5 | N/A |
| " | 70 g | 1100 g | 0.078 | 0.9179 | 1.4 | 27.1 | 123.9 |
| " | 70 g | 1000 g | 0.089 | 0.9172 | 1.3 | 28.3 | 123.2 |
| " | 70 g | 1000 g | 0.101 | 0.9135 | 1.2 | 29.5 | 122.5 |
| Comparative Example 1 | 60 g | 1000 g | 0.067 | 0.9230 | 1.0 | 32.0 | N/A |
| Comparative Example 1 | 60 g | 1000 g | 0.078 | 0.9210 | 1.1 | 32.2 | 126.0 |
| Comparative Example 1 | 60 g | 1000 g | 0.089 | 0.9191 | 1.2 | 32.3 | 125.5 |
| Comparative Example 1 | 60 g | 1000 g | 0.101 | 0.9172 | 1.2 | 33.1 | 125.0 |
| Comparative Example 2 | 55 g | 1000 g | 0.078 | 0.9190 | 2.1 | 37.5 | 125.2 |

TABLE 1-continued

Gas Phase ethylene/1-hexene co-polymerization results

| | Pre-polymer used | Yield | C6/C2 | Density | M.I. | MFRR | Tm (° C.) by DSC |
|---|---|---|---|---|---|---|---|
| Comparative Example 2 | 55 g | 1000 g | 0.089 | 0.9175 | 1.5 | 35.8 | 124.5 |
| Example 3 | 55 g | 1200 g | 0.078 | 0.9172 | 1.3 | 27.5 | 123.9 |
| " | 55 g | 1200 g | 0.089 | 0.9155 | 1.4 | 28.5 | 123.2 |
| Example 4 | 60 g | 1000 g | 0.078 | 0.9175 | 1.1 | 27.1 | 123.9 |
| " | 60 g | 1000 g | 0.089 | 0.9168 | 1.3 | 28.0 | 123.4 |
| Example 5 | 65 g | 1000 g | 0.078 | 0.9185 | 1.2 | 27.6 | 124.0 |
| " | 65 g | 1000 g | 0.089 | 0.9175 | 1.3 | 28.3 | 123.6 |
| Example 6 | 65 g | 1000 g | 0.078 | 0.9184 | 1.0 | 27.3 | 123.9 |
| " | 65 g | 1000 g | 0.089 | 0.9170 | 1.5 | 29.0 | 123.1 |
| Example 7 | 60 g | 1000 g | 0.078 | 0.9179 | 1.2 | 25.8 | 124.0 |
| " | 60 g | 1000 g | 0.089 | 0.9165 | 1.3 | 28.1 | 123.5 |
| Example 8 | 55 g | 1100 g | 0.078 | 0.9171 | 1.2 | 27.3 | 123.9 |
| " | 55 g | 1150 g | 0.089 | 0.9155 | 1.0 | 28.6 | 123.1 |
| Example 9 | 60 g | 1000 g | 0.078 | 0.9164 | 1.5 | 28.1 | 123.0 |
| " | 60 g | 1000 g | 0.089 | 0.9146 | 1.6 | 28.6 | 122.5 |
| Example 10 | 50 g | 1200 g | 0.078 | 0.9169 | 1.2 | 28.0 | 123.7 |
| " | 50 g | 1150 g | 0.089 | 0.9155 | 1.3 | 28.6 | 122.9 |
| Example 11 | 60 g | 1100 g | 0.078 | 0.9169 | 1.6 | 28.0 | 123.1 |
| " | 60 g | 1300 g | 0.089 | 0.9145 | 1.9 | 28.6 | 122.4 |

Lower value of MFRR indicates molecular weight distribution is narrow. Lower Tm indicates narrow branch distribution. Comparative examples show 3-4 MFRR value difference and 1-2° C. difference in Tm. These differences illustrate improved molecular weight distribution and branch distribution.

A temperature rising elution fractionation (TREF) plot of the polymers of Example 1, Example 2, and Comparative Example 1 shows a humped portion in the middle and lower portion as the temperature is increased from about 30° C. to about 48° C. and again from about 48° C. to about 95° C. This temperature rising elution fractionation (TREF) data supports asserting that the branch distribution is improved.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A process of forming a catalyst composition (A), comprising:
   forming a solid intermediate (B) by reacting a magnesium metal with an alkyl halide in the presence of an alkoxy aluminum represented by formula $Al(OR^a)_3$, a silicon halide represented by formula $SiX_4$ and an alkoxy silane represented by formula $Si(OR^b)_4$, wherein $R^a$ and $R^b$ are an aromatic or aliphatic alkyl group and wherein X is a halide;
   synthesizing an alkyl metal (C) by reacting alkylaluminum compounds represented by formula $AlR^c_3$ with a secondary amine having formula $HNR^d_2$ and then by reacting with alkyl magnesium compounds represented by formula $R^eMgR^f$, wherein $R^c$, $R^d$, $R^e$ and $R^f$ are an aromatic or aliphatic alkyl group;
   forming a complex by contacting the solid intermediate (B) with an aluminum compound represented by formula $X_{3-n}Al(OY)_n$, and the alkyl metal(C), wherein X is a halide, Y is a hydrocarbon group or chelating carbonyl group, and wherein 1 is less than or equal to n which is less than or equal to 3; and then contacting the complex with a titanium halide having formula $TiX_4$ wherein X is a halide.

2. The process of forming the catalyst composition of claim 1, wherein reaction between magnesium metal and alkyl halide in forming solid intermediate (B) is initiated by alkoxy aluminum represented by formula $Al(OR^a)_3$, and then propagated in the presence of silicon halide represented by formula $SiX_4$ and alkoxy silane represented by formula $Si(OR^b)_4$ wherein $R^a$ and $R^b$ are an aromatic or aliphatic alkyl group.

3. The process of forming the catalyst composition of claim 1, wherein alkoxy compounds represented by the formula $X_{3-n}Al(OY)_n$ contain a non-chelating alkoxy group which is aluminum triethoxide, aluminum tri-sec-butoxide, aluminum butoxide, diethoxyaluminum chloride, or combinations thereof.

4. The process of forming the catalyst composition of claim 1, wherein alkoxy compounds represented by the formula $X_{3-n}Al(OY)_n$ contain a chelating alkoxy group which is aluminum butoxide bisethylacetoacetate, aluminum dibutoxide ethylacetoacetate, aluminum tetranethyl 3, 5 heptanedionate, aluminum 2,4-pentanedionate, aluminum diisopropoxide ethylacetacetate, aluminum-8-hydroxyquinolinate, or combinations thereof.

5. The process of forming the catalyst composition of claim 1, wherein said alkoxy aluminum represented by formula $Al(OR^a)_3$ is $Al(O\text{-}_sBu)_3$, $Al(OMe)_3$, $Al(OEt)_3$, $Al(OnC_3HT)_3$, $Al(OiC_3HT)_3$, $Al(OnC_4H_9)_3$, $Al(O\text{-}tCaH_9)_3$, $Al(OC6H_{13})_3$, $Al(OC_6H_5)_3$, or combinations thereof.

6. The process of forming the catalyst composition of claim 1, wherein the secondary amine represented by the formula $HNR^d_2$ is selected from the group consisting of branched amines, cyclic amines having 4-14 carbons, and aromatic amines.

7. The process of forming the catalyst composition of claim 1, wherein the $R^d$ is cyclic hydrocarbon represented by formula $C_nH_{2n}$ wherein n is a number larger than 4.

8. The process of forming the catalyst composition of claim 7, wherein $R^d$ is a cyclopentyl, cyclohexyl, cycloheptyl, or cyclooctyl cyclic hydrocarbon.

9. The process of forming the catalyst composition of claim 1, wherein the alkyl metal (C) comprises an atomic ratio of aluminum to magnesium of about 0.3 to about 2.0.

10. The process of forming the catalyst composition of claim 1, wherein the alkyl metal (C) is synthesized with an alkylmagnesium compound selected from the group consisting of butyloctylmagnesium, dibutylmagnesium and butylethylmagnesium.

11. The process of forming the catalyst composition of claim 1, wherein the alkyl metal (C) is synthesized using an alkylaluminum that is triethylalurninum, tributylaluminum, trioctylaluminum, trimethylaluminum or combination thereof.

12. The process of forming the catalyst composition of claim 1, further comprising exposing the complex to an alkylaluminum co-catalyst (D) wherein the co-catalyst (D) is diethylaluminum chloride, dibutylaluminum chloride, ethylaluminum sesquichloride, and butylaluminum sesquichloride, or combinations thereof.

13. A process of forming a catalyst system comprising a catalyst component (A) and a co-catalyst (D), comprising preparing the catalyst component (A) by:

forming solid intermediate (B) by reacting magnesium metal with an alkyl halide in the presence of an alkoxy aluminum represented by formula $Al(OR^a)_3$, a silicon halide represented by formula $SiX_4$ and an alkoxy silane represented by formula $Si(OR^b)_4$ wherein R, $R^a$ and $R^b$ are an aromatic or aliphatic alkyl group;

synthesizing an alkyl metal (C) by reacting alkylaluminum compounds represented by formula $AlR^c_3$, with a secondary amine having formula $HNR^d_2$, and then reacting with alkylmagnesium compounds represented by formula $R^eMgR^f$ where in $R^c$, $R^d$, $R^e$ and $R^f$ are an aromatic or aliphatic alkyl group; and forming catalyst component (A) by contacting the solid intermediate (B) with an aluminum compound represented by formula $X_{3-n}Al(OY)_n$, with alkyl metal(C), and then with titanium halide having formula $TiX_4$, wherein X is a halide, Y is an hydrocarbon or chelating carbonyl group or carbonyl group, and wherein 1 is less than or equal to n which is less than or equal to 3.

14. The process of forming the catalyst system of claim 13, wherein the alkylaluminum compound is selected from the group consisting of triethylaluminum, tributylaluminum, trioctylaluminum, trimethylaluminum, or combinations thereof.

15. The process of forming the catalyst system of claim 13, further comprising alkylaluminum co- catalyst (D) wherein the co-catalyst (D) is diethylaluminum chloride, dibutylaluminum chloride, ethylaluminum sesquichloride, and butylaluminum sesquichloride, or combinations thereof.

\* \* \* \* \*

UNITED STATES PATENT AND TRADEMARK OFFICE
CERTIFICATE OF CORRECTION

PATENT NO. : 7,651,969 B2  Page 1 of 1
APPLICATION NO. : 11/634325
DATED : January 26, 2010
INVENTOR(S) : Kong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 457 days.

Signed and Sealed this

Twenty-third Day of November, 2010

David J. Kappos
*Director of the United States Patent and Trademark Office*